US006352474B1

(12) United States Patent
Payne et al.

(10) Patent No.: US 6,352,474 B1
(45) Date of Patent: Mar. 5, 2002

(54) METERING EDGE FOR AXIALLY ARRANGED ROTARY SEPARATOR

(75) Inventors: Jeffrey Ray Payne; Merle Ray Gerber, both of Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/594,992

(22) Filed: Jun. 15, 2000

(51) Int. Cl.[7] ............................. A01F 7/06; A01F 12/00
(52) U.S. Cl. ........................... 460/66; 460/80; 460/111
(58) Field of Search .......................... 460/59, 64, 66, 460/67, 69, 73, 79, 80, 81, 75, 98, 107, 111, 112, 119, 901, 905, 142

(56) References Cited

U.S. PATENT DOCUMENTS

| | | | |
|---|---|---|---|
| 3,863,643 A | * 2/1975 | DePauw | 460/66 |
| 4,254,780 A | 3/1981 | Powell et al. | 130/27 T |
| 4,273,138 A | 6/1981 | Pauli | 130/27 T |
| 5,344,367 A | * 9/1994 | Gerber | 460/68 |
| 6,241,605 B1 | * 6/2001 | Pfeiffer et al. | 460/69 |

* cited by examiner

*Primary Examiner*—Thomas B. Will
*Assistant Examiner*—Nathan Mammen

(57) ABSTRACT

The discharge section of an axially arranged rotary combine is provided with a metering edge overhanging a discharge chute. The metering edge is asymmetrical having a downswept edge and an upswept edge. The downswept edge is more open that the upswept edge. The downswept edge opens continually until the bottom dead center of the metering edge. The upswept edge closes continually form the bottom dead center of the metering edge. The downswept edge opens more slowly than the upswept edge closes

16 Claims, 3 Drawing Sheets

METERING EDGE FOR AXIALLY ARRANGED ROTARY SEPARATOR

BACKGROUND OF THE INVENTION

1. Field of the Invention

The present invention is directed to the discharge arrangement used on an axially arranged rotary separator for more uniformly distributing the discharged crop material other than grain in a transverse swath out the rear of the combine.

2. Description of the Prior Art

Agricultural combines are large machines that harvest, thresh, separate and clean an agricultural crop. The resulting clean grain is stored in a grain tank located on the combine. The clean grain can then be transported from the grain tank to a truck, grain cart or other receiving bin by an unloading auger.

Axially arranged rotary combines have one or two large axial crop processing units located along the longitudinal axis of the machine for threshing and separating the harvested crop material. These axial crop processing units are provided with an infeed section for receiving harvested crop material; a threshing section for threshing the harvested crop material received from the infeed section; a separating section for freeing grain trapped in the threshed crop material received from the threshing section; and a discharge section for discharging crop other than grain out of the axial crop processing unit.

The harvested crop is delivered to the infeed section by the feederhouse. The crop is arranged in a crop mat that the infeed elements of the rotor need to take up and rotate into a helical flow. The helical flow of crop material moves from the infeed section to the threshing section and then to the separating section. Grain together with chaff located in the crop material is removed from the axial crop processing units by falling through grates located at the bottom of the units. Crop material other than grain, such as straw, enters the discharge section of the crop processing units from the separating section. The discharge section then expels the crop material other than grain out the rear of the combine or directs this material to a straw chopper located at the rear of the combine.

It is important to distribute the crop material other grain in a uniform transverse swath out the rear of the combine to better manage crop residue on the ground. Currently axially arranged rotary combines used specialized discharge elements on the rotor for directing the crop material to a transverse beater. It is difficult for this type of discharge arrangement to have both excellent material discharge characteristics and excellent transverse distribution in a wide variety of crops and crop conditions. Usually either the combine has excellent material discharge characteristics and marginal transverse distribution or vice versa.

SUMMARY

It is an object of the present invention to provide a discharge arrangement that has both excellent material discharge characteristics and also excellent transverse distribution characteristics in a wide range of crops and crop conditions.

To minimize the disruption of the helical flow of crop material other than grain in the discharge section, the crop engaging elements mounted to the rotor are the same in the discharge section as they are in the separating section. This makes the helical flow of crop material other than grain more uniform.

In the discharge section, the casing for the axial crop processing unit terminates in a metering edge. This metering edge has a downward swept side and an upward swept side as defined by the rotation of the axial crop processing unit's rotor. Located immediately below the metering edge is a discharge chute for directing the flow of crop material other than grain to a transverse beater. The transverse beater expels crop material other than grain directly out the rear of the combine or directly to a straw chopper.

The metering edge overhangs the discharge chute. The metering edge has a downward swept edge and an upward swept edge that are joined at the bottom dead center of the metering edge. The downward swept edge of the metering edge increasing opens as the metering edge extends downwardly to the bottom dead center of the metering edge. As the metering edge extends upwardly from the bottom dead center defining the upward swept edge the metering edge increasingly closes. The downward swept edge of the metering edge opens at a slower rate that the upward swept edge of the metering edge closes.

The discharge cute is provided with a sloping floor, a downward swept side wall and an upward swept front wall. The downward swept side wall is provided with an upstream panel and a downstream panel. The upstream panel extends from the bottom dead center of the metering edge to the downstream panel. Both the upstream panel and the downstream panel of the downward swept side wall extend transversely and rearwardly. The downstream panel extends rearwardly to a greater degree than the upstream panel. The upward swept side wall also extends transversely and rearwardly from the bottom dead center.

DETAILED DESCRIPTION

Figure 1:
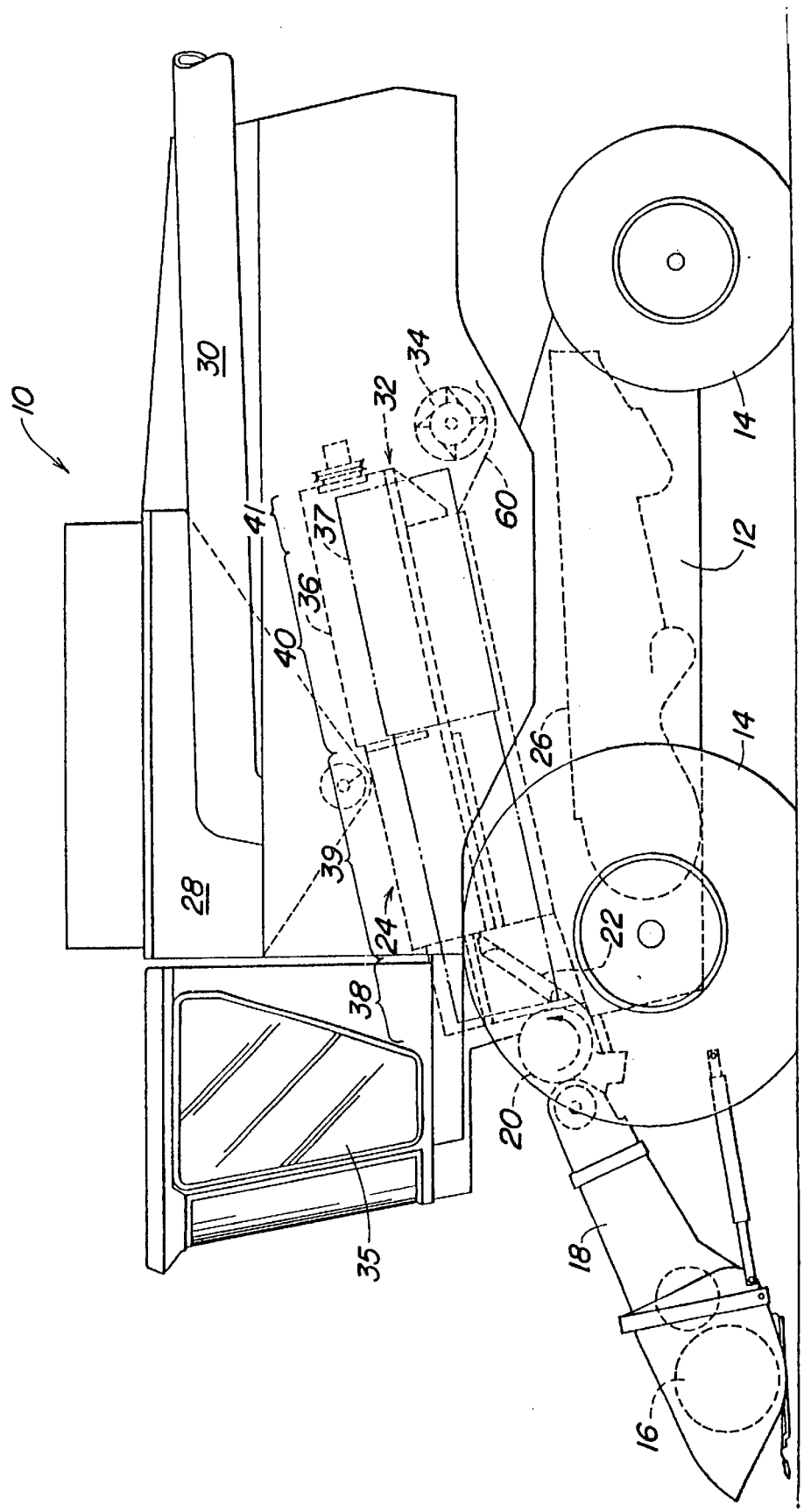
FIG. 1 is a side view of an axially arranged rotary agricultural combine.

FIG. 1 shows an agricultural combine 10 comprising a supporting structure 12 having ground engaging wheels 14 extending from the supporting structure. Although the combine is illustrated as having wheels it could also have ground engaging tracks either full tracks or half tracks. A harvesting platform 16 is used for harvesting a crop and directing it to a feederhouse 18. The harvested crop is directed by the feederhouse 18 to a beater 20. The beater directs the crop upwardly through an inlet transition section 22 to the axial crop processing unit 24.

The crop processing unit threshes and separates the harvested crop material. Grain and chaff fall through grates on the bottom of the unit 24 to cleaning system 26. The cleaning system 26 removes the chaff and directs the clean grain to a clean grain elevator (not shown). The clean grain elevator deposits the clean grain in grain tank 28. The clean grain in the tank can be unloaded into a grain cart or truck by unloading auger 30.

Threshed and separated straw is discharged from the axial crop processing unit through outlet 32 to discharge beater 34. The discharge beater in turn propels the straw out the rear of the combine. It should be noted that the discharge beater 34 could also discharge crop material other than grain directly to a straw chopper. The operation of the combine is controlled from operator's cab 35.

The axial crop processing unit comprises a cylindrical rotor housing 36 and a rotor 37 located inside the housing 36. The front part of the rotor and the rotor housing define the infeed section 38 of the crop processing unit. Longitudinally downstream from the infeed section 38 are threshing section 39, separating section 40 and discharge section 41. The rotor in the infeed section is provided with a conical rotor drum having helical infeed elements for engaging harvested crop material received from the beater 20 and inlet transition section 22. Immediately downstream from the infeed section 38 is the threshing section 39 of the crop processing unit 24. In the threshing section 39 the rotor comprises a cylindrical rotor drum 49 having a number of threshing elements for threshing the harvested crop material received from the infeed section 38. Downstream from the threshing section 39 is the separating section 40 wherein the grain trapped in the threshed crop material is released and falls through a floor grate to the cleaning system 28. The separating section merges into a discharge section 41 where crop material other than grain is expelled from the axial crop processing unit 24.

Figure 2:
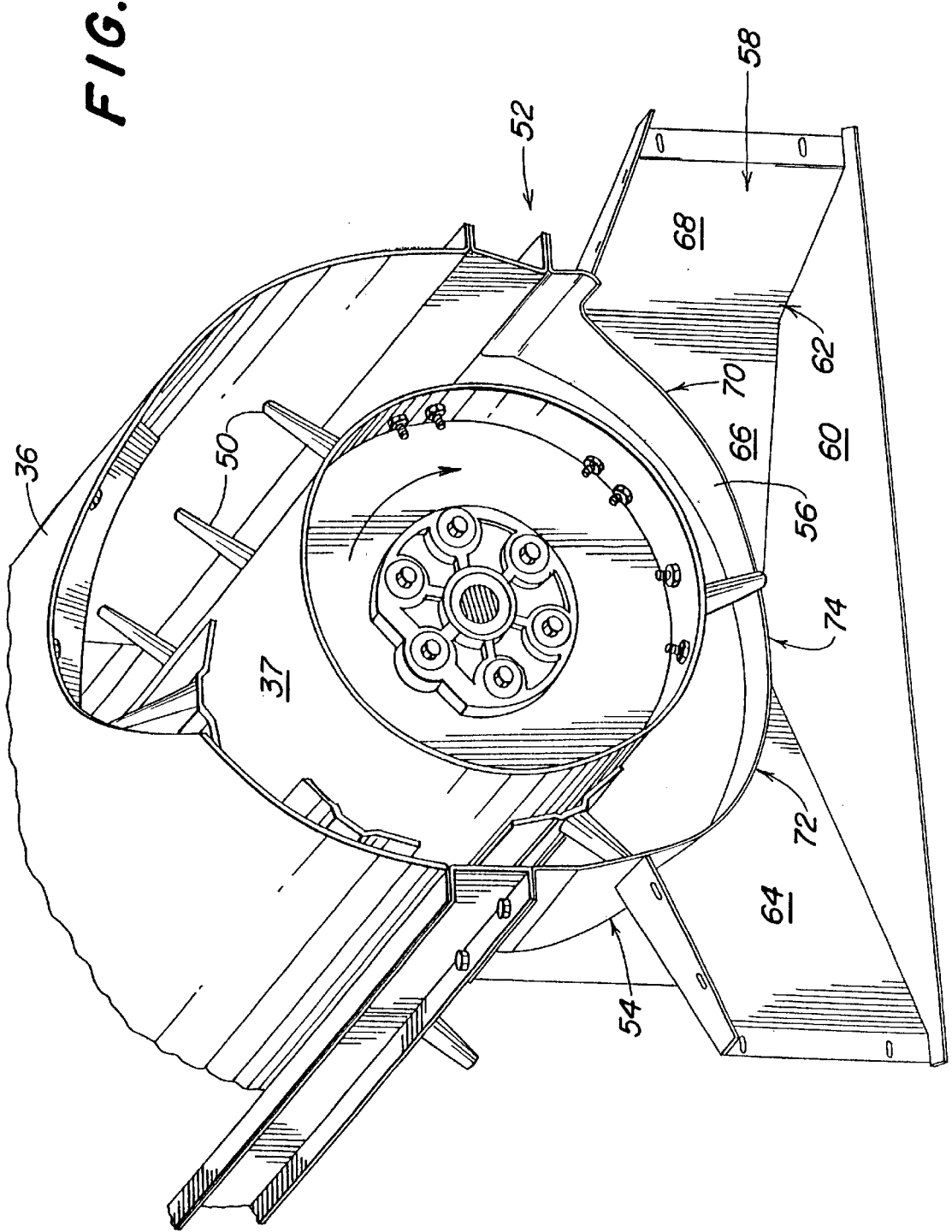
FIG. 2 is a rear perspective view of the discharge section of the axial crop processing unit.
Figure 3:
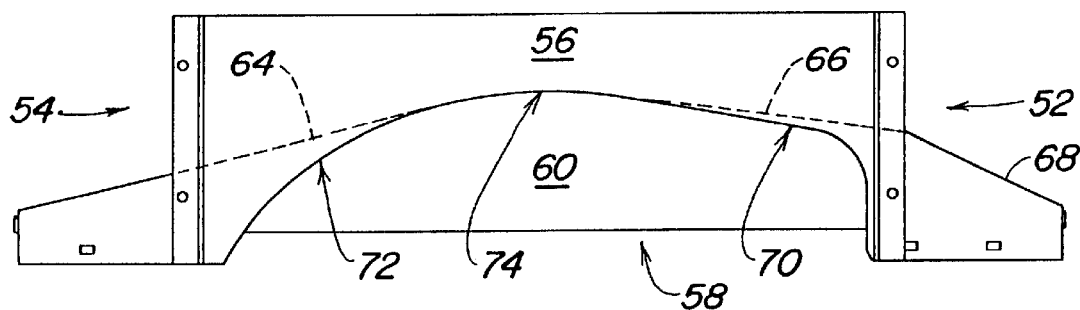
FIG. 3 is a top view of the metering edge and discharge chute.
Figure 4:
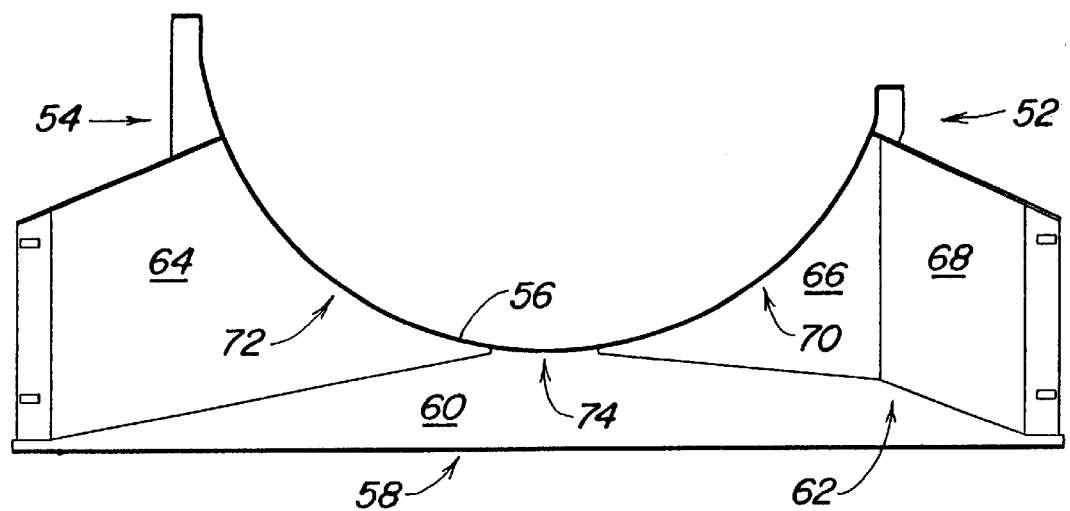
FIG. 4 is a rear view of the metering edge and discharge chute.

The discharge section 41 of the axial crop processing unit 24 is best illustrated in FIG. 2. The portion of the rotor 37 located in the separating and discharge sections 40 and 41 is provided with crop engaging elements 50. This rotor portion and the arrangement of the elements 52 is the same for the separating section and the discharge section to minimize disruption of the helical flow of crop material other than grain. As viewed in FIG. 2, the rotor is rotated in a clockwise direction, making the right side of the rotor housing 36 the downward swept side 52 and the left hand side of the rotor housing the upward swept side 54.

The discharge section 41 is provided with a metering edge 56 that overhangs a discharge chute 58. The discharge chute 58 is provided with a sloping floor 60, a downward swept side wall 62, and an upward swept side wall 64. The sloping floor 60 extends downwardly directing crop material to the transverse beater 34. The downward swept side wall 62 has two panels, an upstream panel 66 and a downstream panel 68. The overhanging metering edge has a downward swept edge 70 and an upward swept edge 72 that are joined together at the bottom dead center 74 of the metering edge 56. The metering edge 56 has a unique asymmetrical shape. More specifically, the downward swept edge 70 is more open and increasing open, that is extends forwardly, to the bottom dead center 74 of the metering edge 56. The upward swept edge 72 increasingly closes, that is extends rearwardly, as it extends upwardly from the bottom dead center 74 of the metering edge 56. The downward swept edge opens at a slower rate that the upward swept edge closes, making the metering edge asymmetrical.

This unique asymmetrical metering edge more evenly distributes the crop material other than grain to the transverse beater 34. There is a tendency for a rotor to carry the crop material and expel a major portion of the crop material to the upswept side of the discharge chute. To overcome this concentrating tendency, the downswept edge of the metering edge opens quickly to encourage the expulsion of the crop to the downswept side of the discharge chute. The downswept metering edge is slowly and continually opened until it reaches bottom dead center of the metering edge. As the metering edge extends into the upswept metering edge the metering edge more quickly closes metering the flow of crop material to the upswept side of the discharge cute. Crop material closed off by the upswept metering edge is carried around and expelled to the downswept side of the discharge chute.

In referring to the bottom dead center of the metering edge this application is referring to a general area not a specific point.

This invention should not be limited by the above described embodiments, but should be limited solely by the claims that follow:

We claim:

1. An axial crop processing unit for an axially arranged rotary agricultural combine, comprising:

a rotor, having an infeed section for receiving harvested crop material, a threshing section for threshing the harvested crop material from the infeed section, and a separating section for separating grain from the threshed crop material received from the threshing section, the separating section having crop engaging elements, a discharge section merging with the separating section for discharging crop material other than grain from the axial crop processing unit, the discharge section having crop engaging elements that are the same as those used in the separating section, the rotor having a direction of rotation;

the direction of rotation of the rotor defining a downward swept side, and upward swept side and a bottom dead center located between the upward swept side and the downward swept side in the discharge section, the discharge section being provided with a metering edge for metering the flow of crop material from the rotor, the metering edge having a downward swept edge corresponding to the downward swept side of the discharge section and an upward swept edge corresponding to the upward swept side of the discharge section and a bottom dead center that corresponds to the bottom dead center of the discharge section, the metering edge being asymmetrical with the downward swept metering edge being more open that the upward swept metering edge.

2. An axial crop processing unit as defined by claim 1 wherein the downward swept metering edge opens continually as it extends to the bottom dead center of the metering edge.

3. An axial crop processing unit as defined by claim 2 wherein the upward swept metering edge closes continually as it extends from the bottom dead center of the metering edge.

4. An axial crop processing unit as defined by claim 3 wherein the downward swept metering edge opens more slowly that the upward swept metering edge closes.

5. An axial crop processing unit as defined by claim 4 wherein the discharge section is provided with a discharge chute underlying the metering edge.

6. An axial crop processing unit as defined by claim 5 wherein the discharge chute is provided with a downwardly sloping floor and a downswept side wall and an upswept side wall.

7. An axial crop processing unit as defined by claim 6 wherein the downswept side wall is provided with an upstream panel and a downstream panel.

8. An axial crop processing unit as defined by claim 7 wherein the upstream panel and the downstream panel extend rearwardly and outwardly with the downstream panel extending more rearwardly that the upstream panel.

9. An axial crop processing unit as defined by claim 1 wherein the upward swept metering edge closes continually as it extends from the bottom dead center of the metering edge.

10. An axially arranged rotary combine for harvesting, threshing and separating an agricultural crop, said combine comprising;

a supporting structure;

ground engaging means extending from the supporting structure for transporting the supporting structure across a field;

an axial rotor housing located inside the supporting structure, the rotor housing is provided with an infeed section for introducing crop into the housing, a threshing section for threshing grain from harvested crop material and a separating section for separating grain from the threshed crop material, and a discharge section for discharging crop material other than grain from the axial rotor housing;

an axial rotor located in the rotor housing having an infeed section, a threshing section, a separating section and a discharge section corresponding to the infeed, threshing, separating and discharge sections of the axial rotor housing, the rotor has a direction of rotation defining a downward swept side and an upward swept side; and the discharge section of the axial rotor housing is provided with a metering edge overhanging a discharge chute for directing crop material to a transverse discharge beater, the metering edge having a downswept edge and an upswept edge, the metering edge being asymmetrical as the downswept edge is more open that the upstream edge.

11. An axially arranged rotary combine as defined by claim 10 wherein the downward swept metering edge opens continually as it extends to the bottom dead center of the metering edge.

12. An axially arranged rotary combine as defined by claim 11 wherein the upward swept metering edge closes continually as it extends from the bottom dead center of the metering edge.

13. An axially arranged rotary combine as defined by claim 10 wherein the upward swept metering edge closes continually as it extends from the bottom dead center of the metering edge.

14. An axially arranged rotary combine as defined by claim 13 wherein the discharge chute is provided with a downwardly sloping floor and an downswept side wall and an upswept side wall.

15. An axially arranged rotary combine as defined by claim 14 wherein the downswept side wall is provided with an upstream panel and a downstream panel.

16. An axially arranged rotary combine as defined by claim 15 wherein the upstream panel and the downstream panel extend rearwardly and outwardly with the downstream panel extending more rearwardly that the upstream panel.

* * * * *